Figure 1:
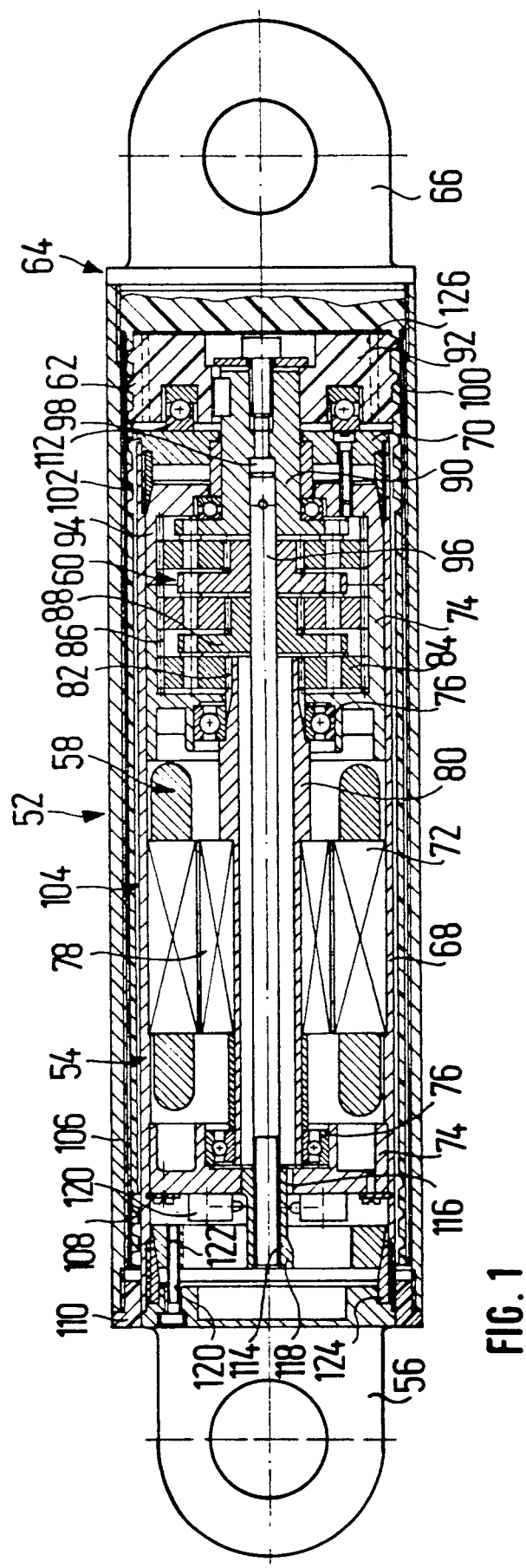

United States Patent [19]

Pradler

[11] Patent Number: 5,121,019
[45] Date of Patent: Jun. 9, 1992

[54] ROTARY TO LINEAR DRIVE UNIT

[76] Inventor: Josef Pradler, Neue Weilheimer Strasse 14, 7312 Kirchheim/Teck, Fed. Rep. of Germany

[21] Appl. No.: 341,247

[22] Filed: Apr. 19, 1989

Related U.S. Application Data

[63] Continuation of Ser. No. 279,281, Nov. 23, 1988, which is a continuation of Ser. No. 205,616, Jun. 6, 1988, which is a continuation of Ser. No. 90,163, Aug. 27, 1987, abandoned.

[30] Foreign Application Priority Data

Aug. 26, 1986 [DE] Fed. Rep. of Germany ....... 3629279
Feb. 2, 1987 [DE] Fed. Rep. of Germany ... 8702656[U]

[51] Int. Cl.$^5$ ............................................... H01L 7/06
[52] U.S. Cl. ............................................................ 310/83
[58] Field of Search ................. 310/12, 14, 67 R, 80, 310/83; 74/424.8 R, 424.8 C, 89.15

[56] References Cited

U.S. PATENT DOCUMENTS

| | | | |
|---|---|---|---|
| 2,438,545 | 3/1948 | Davidson | 310/83 X |
| 2,444,886 | 7/1948 | Vickers | 310/83 X |
| 2,482,464 | 9/1949 | Chapman | 310/83 X |
| 3,161,074 | 12/1964 | Horthouse | 74/89.15 |
| 3,269,199 | 8/1966 | Deehan et al. | 74/89.15 X |
| 3,660,704 | 5/1972 | Paine | 310/83 X |
| 3,861,221 | 1/1975 | Stanley | 74/424.8 |
| 4,137,784 | 11/1977 | Griffin | 74/89.15 |
| 4,484,093 | 11/1984 | Smith | 310/83 X |
| 4,521,707 | 6/1985 | Baker | 310/83 X |
| 4,573,364 | 3/1986 | Givan | 310/83 X |
| 4,686,402 | 8/1987 | Wurst | 310/83 |

FOREIGN PATENT DOCUMENTS

| | | |
|---|---|---|
| 0006062 | 12/1979 | European Pat. Off. |
| 0157747 | 10/1985 | European Pat. Off. |
| 0188402 | 7/1986 | European Pat. Off. |
| 855785 | 11/1951 | Fed. Rep. of Germany |
| 944464 | 6/1956 | Fed. Rep. of Germany |
| 1931860 | 1/1970 | Fed. Rep. of Germany |
| 152976 | 12/1981 | Fed. Rep. of Germany |
| 3245119 | 6/1983 | Fed. Rep. of Germany |
| 2298742 | 8/1976 | France |
| 636171 | 4/1950 | United Kingdom |
| 779420 | 7/1957 | United Kingdom |

Primary Examiner—Mark O. Budd
Attorney, Agent, or Firm—William W. Jones

[57] ABSTRACT

A linear drive unit (52), comprising
(a) a housing (54) in which a driving motor (58) is accommodated;
(b) a driven rod (64) adapted to be driven in linear manner and having a hollow portion (104) which partly extends over the housing (54) and is supported on the outer circumference of the housing (54) in axially slidable manner;
(c) a conversion drive (62) which is in driving connection with the motor (58) and the driven rod (64) and converts rotational movement into linear movement of the driven rod (64);
(d) a drive body (92) which belongs to the conversion drive (62) and is adapted to be driven by the motor in rotating manner and which is provided on its outer circumference with a circumferential groove profile (160) and with teeth (162);
(e) a pluralityy of axially extending revolving members (166) which are rotatable about their own axes and which each have a circumferential groove profile (172) as well as teeth (174);
(f) engagement of the groove profiles (172) of the revolving members (166) at a radially inner location with the groove profile (160) of the drive body (92) and at a radially outer location with a circumferential groove profile (164) on the inner circumference of the hollow portion (104) of the driven rod (64), as well as engagement of the teeth (174) of the revolving members (166) with the teeth (162) of the drive body (92);
(g) a design of the groove profiles (150, 172, 164) of the drive body (92), the revolving members (166) and the hollow portion (104) of the driven rod in such a manner that, during rotation of these parts, there is no axial relative movement between the drive body (92) and the revolving members (166) and the driven rod (64) carries out an axial relative movement with respect to the revolving members (166).

19 Claims, 4 Drawing Sheets

ROTARY TO LINEAR DRIVE UNIT

This is a continuation of Ser. No. 279,281, filed Nov. 23, 1988, which is a continuation of Ser. No. 205,616, filed Jun. 6, 1988, which is a continuation of Ser. No. 090,163, filed Aug. 27, 1987, now abandoned.

The subject matter of the invention is a linear drive unit comprising:

(a) a housing in which a driving motor is accommodated;

(b) a driven rod adapted to be driven in linear manner and having a hollow portion which partly extends over the housing and is supported on the outer circumference of the housing in axially slidable manner;

(c) a conversion drive which is in driving connection with the motor and the driven rod and converts rotational movement into linear movement of the driven rod;

(d) a drive body which belongs to the conversion drive and is adapted to be driven by the motor in rotating manner and which is provided on its outer circumference with a circumferential groove profile and with teeth;

(e) a plurality of axially extending revolving members which are rotatable about their own axes and which each have a circumferential groove profile as well as teeth;

(f) engagement of the groove profiles of the revolving members at a radially inner location with the groove profile of the drive body and at a radially outer location with a circumferential groove profile on the inner circumference of the hollow portion of the driven rod, as well as engagement of the teeth of the revolving members with the teeth of the drive body;

(g) a design of the groove profiles of the drive body, the revolving members and the hollow portion of the driven rod in such a manner that, during rotation of these parts, there is no axial relative movement between the drive body and the revolving members and the driven rod carries out an axial relative movement with respect to the revolving members.

Linear drive units are known in quite a number of construction types, and the most fundamental components to be found again and again can be seen in a driving motor, a driven rod adapted to be driven in linear manner, a conversion drive in driving connection with the motor and converting rotational movement into linear movement of the driven rod, and frequently a step-down gear means between the motor and the conversion drive. A frequently chosen form of the conversion drive is a drive comprising a nut and a threaded spindle.

Furthermore, a more specific construction type is known (DE-C-855 785) in which the driven rod has a hollow portion which is provided with an internal thread and which partly extends over a housing of the driving motor and is supported on the outer circumference of said housing in axially slidable manner. This mode of construction has the advantage that more space is available for the conversion drive and that the driven rod may be of large diameter, virtually without requiring additional space, whereby conversion drives of strong dimensions can be provided and great linear driving forces can be managed without a risk of buckling of the driven rod.

DE-C-855 785 shows various possibilities of the constructional design of the conversion drive, one thereof being a design in which a rotatable drive body which is in driving connection with the motor is provided on its circumference with a plurality of revolving members having a circumferential groove profile which is in threaded engagement with an internal thread of the hollow portion of the driven rod. With this design, the great linear forces produced by the linear drive unit must be transferred through the support of the small-diameter revolving members to the drive body, whereby a region of the linear drive unit is created here which is subject to high loads and to the danger of wear. It is the object of the subject matter of the invention according to claim 1 to provide a linear drive unit which in terms of construction is suited to generate high linear forces and in which the conversion drive is designed such that it is more favorable with respect to loads.

According to the invention, this object is met by claim 1.

The support of the revolving members, which as a rule are of small diameter, is virtually kept free of axial forces, and the linear forces supplied by the linear drive unit are fed into the drive body via the engagement of the revolving member groove profiles and the drive body groove profile with selectable axial length. The toothed engagement between the drive body and the revolving members makes sure that there is no slip between the drive body and revolving members. The groove profiles of the drive body and of the revolving members are preferably designed as threads, with the thread direction of the revolving members being opposite to the thread direction of the drive body, i.e. a left-hand thread on the drive body and a right-hand thread on the revolving members or vice versa.

The term "groove profile" in connection with the drive body, the revolving members and the hollow portion of the driven rod has been chosen to cover in each particular case a group of parallel, circular grooves returning in themselves and diposed axially beside one another, as well as a helical groove path corresponding to a thread. When the groove profiles on the drive body and on the revolving members are designed in the first-mentioned manner, the groove profile on the driven rod must be designed in the manner of a thread in order to achieve the desired conversion of rotational movement into linear movement. When, in contrast thereto, the groove profiles on the drive body and on the revolving members are of thread-like design, the groove profile on the driven rod may be designed either in the first manner mentioned above or it may also be of thread-like design, and in this respect it is possible to provide both a thread direction corresponding to the thread direction of the revolving members (operation in the same direction) and a thread direction opposite to the thread direction of the revolving members (operation in opposite directions).

It is to be ensured that the revolving members—apart from some possible small play—do not carry out an axial relative movement with respect to the drive body. When providing the groove profiles on the drive body and on the revolving members in the form of zero-lead, grooves, one is free to choose the ratio of the diameters of the drive body on the one hand and of the revolving members on the other hand. When, however, the groove profiles of drive body and revolving members are designed so as to have a lead, one must either choose a diameter ratio of 1:1 between drive body on the one hand and revolving members on the other hand or, what is the preferred way, one must choose a thread pitch diameter on the drive body that is an integer multiple of the particular thread pitch diameter on the revolving members. The same applies analogously to the pitch circles of the teeth. In order to prevent that the revolving members carry out an axial relative movement with respect to the drive body, the thread of the drive body must be of multi-flight or multi-start design corresponding to the integer multiple mentioned, cp. claim 3. Particularly preferred are drive bodies having a two-start thread, a three-start thread, a four-start thread, a five-start thread or a six-start thread, each co-operating with revolving members having a one-start thread. "Two-start thread" means, for instance, that a particular thread channel, upon rotation by 360° about the drive body, does not lead into the adjacent thread channel, but in the next thread channel but one. The same holds analogously for threads which are three-start, four-start threads etc. It is particularly preferred to have a combination of drive body and multi-start thread, of correspondingly smaller-diameter revolving members and one-start thread, as well as an internal thread in the hollow portion of the driven rod which is a multi-start thread corresponding to the multi-start design of the drive body thread and has the same thread direction as the threads of the revolving members.

The revolving members are preferably supported in two rings which are rotatable relative to the drive body. This keeps the revolving members at the desired mutual spacing in cirumferential direction. The rings are not highly-loaded components since—as mentioned hereinbefore—the revolving members exert virtually no axial forces to the supports thereof and are supported in radial direction between the driven rod and the drive body.

It is already known per se to provide a drive connection, between an outer nut-like part and an inner, solid, long threaded spindle, by means of threaded members revolving in planetary fashion and being in toothed engagement with an internal gear rim of the nut-like part. However, in case of the invention this known drive has been modified to the effect that the revolving members are driven from radially inside via the teeth, so as to rotate about their particular axes, and that the output is passed to a hollow driven rod which is provided on its inside with a groove profile or thread and which is of great axial length in comparison with the drive body and is supported at its free end on the outside of the housing of the motor of the linear drive unit. In this manner, one has achieved double support of the driven rod, namely on the outside of the motor housing on the one hand and on the conversion drive on the other hand which, due to its construction, provides good prerequisites for taking up the supporting forces.

In a preferred development of the invention, the space between the housing and the hollow portion of the driven rod contains a lubricant, in particular grease, and axial lubricant passageways are provided in the drive body so that the lubricant, during the linear movements of the driven rod, can pass from the one side of the drive body to the other side and back again. These lubricant passageways may also be formed by the spaces between the revolving members. Lubrication effects a considerable increase of the working life.

In order to be able to easily connect the linear drive unit on both ends to a base or an article to be driven in linear manner, the unit conveniently has a mounting or connecting portion at each end thereof. It is preferred to provide these connecting portions in the form of mounting parts which are provided or mounted at the one axial end of the housing and at the axial end of the driven rod facing away from the housing, respectively. Mounting is preferably effected by screw-type engagement, injection molding of a plastics mounting part thereonto, or by attachment by means of a taper ring, with the latter possibility, which is particularly suitable for transmitting great forces and torques, being particularly preferred especially on the one axial end of the housing where reaction torques are to be transmitted as well.

The possibly very considerable axial forces of the driven rod, especially in the direction of pressure application, must be taken up by the linear drive unit. This is effected preferably by an axial thrust bearing between the drive body and an axially adjacent component part of the linear drive unit. Especially advantageous therefor is a sturdy closure or end wall of the housing which may be attached in particular by taper ring clamping.

Depending on the desired total step-down ratio between the motor and the driven rod, one preferably provides in many cases a step-down transmission or gear means between the motor and the drive body. It is particularly suitable to provide one-stage or multi-stage planetary step-down gear means which need little space and can be manufactured in multi-stage design in space-saving manner. The step-down gear means is preferably accommodated in the housing containing the motor.

The linear drive unit according to the invention, especially due to the large diameter of the driven rod, is also suitable for larger linear movement distances or strokes. According to a development of the invention, it is possible in simple manner to make the stroke especially large by making the housing longer than it would actually be necessary for accommodating the motor and, optionally, the step-down gear means, for instance by attaching a cylindrical housing extension part. In this manner, it is also possible to manufacture linear drive units of different stroke in simple manner, without the necessity of changing something else in the overall construction.

It is preferred to integrate in the linear drive unit at least one limit switch, suitably one limit switch for each end position in each direction of linear movement, which is adapted to be actuated by an actuation member movable in linearly driven manner. A particularly space-saving and favorable construction therefor resides in that a transmission shaft is coupled with the shaft driving the drive body, which transmission shaft extends through the hollow rotor of the motor and, optionally, through the step-down gear means and, on the other axial side of the motor, is in engagement, in the form of a threaded spindle, with a travelling nut so as to form a limit switch actuation member. Due to the fact that the thread lead in the pair of limit-switch threaded spindle/limit-switch travelling nut can be chosen to be different than in the pair of drive body/driven rod, it is possible to make do with little space for the end-position deactivation.

In certain applications it is advantageous to have available a deactivation of the driving motor that is dependent on the linear force of the driven rod. A preferred possibility therefor resides in designing two parts of the linear drive unit, which are located in the region of force flow, such that they are movable relative to each other against spring force. Longitudinal forces of the driven rod which are above a preferably adjustable limit value, will then become felt as axial deflection movement of one of the two parts that are movable relative to each other, and this deflection movement can be used for the actuation of a switch or one switch per linear direction. Force-dependent deactivation or switching-off is independent of a (end position) deactivation that is dependent on the position of the driven rod, so that limit switch adjustments do no longer have an effect and the function of a deactivation for safety reasons is present also in the entire range of the stroke of the driven rod. However, the force-actuated deactivation contains in itself also the function of the end-position deactivation when a corresponding resistance or stop is hit in the end positions of the driven rod. Besides, slip between the revolving members and the driven rod, which may theoretically occur in extreme cases, no longer has the disadvantageous effect of causing a misplacement in the relation between the limit switches and the driven rod, so that precise deactivation is provided independently of possible slip.

A constructionally especially favorable solution of the force-actuated deactivation resides in that, on an axial end of the linear drive unit, there is provided a mounting part which is held unrotatable relative to the housing and extends in axially slidable manner through an end wall opening into the interior of the linear drive unit, that a spring unit is provided between a shoulder formed on the mounting part and an abutment in the linear drive unit, and in that the mounting part is provided with an actuation member which actuates the at least one switch upon sufficiently great displacement of the mounting part in the end wall opening. Preferably, a common spring unit is provided for both directions of axial deflection movement of the mounting part, which is supported on the side opposite the shoulder, at a radially inner location against an additional shoulder of the mounting part and at a radially further outer location against the abutment, and at a location radially outside of the first shoulder against an additional abutment. In an especially favorable design, the (first-mentioned) shoulder can be formed by a nut which is threaded onto the mounting part and by tightening of which the spring unit can be biased.

In a development of the invention it is preferred for specific applications to provide the linear drive unit in the form of an apparatus having two driven rods, which are movable in the same or opposite directions, and to arrange the linear drive unit at a central position. A constructionally especially preferred possibility therefor consists in coupling, with the shaft driving the first drive body, an intermediate shaft which extends through the hollow rotor of the motor and, optionally through the step-down gear means to the other axial side of the motor and carries on said other side a second drive body forming together with the second driven rod a second conversion drive. It is to be noted that the second conversion drive and the second driven rod preferably are of analogous design, as described hereinbefore for the first conversion drive and the first driven rod.

In a preferred form of the invention, the circumferential groove profile or the thread on the internal circumference of the driven rod is provided on at least two sleeves which are axially placed against one another and welded in a common tube that is slid thereonto. The reason therefor is that is has been found out that internal threads having a greater length or a greater ratio of length to diameter are relatively difficult or expensive to manufacture. It is therefore preferred to manufacture such relatively long internal threads by producing shorter sleeves having internal threads, by threading these sleeves together on a spindle-like part with external thread so that the thread transition of the sleeves matches smoothly, by subsequently sliding an exactly fitting outer tube with smooth inside over the sleeve arrangement, by then welding the sleeves to the outer tube and by finally removing the spindle-like inner part by unscrewing.

In particular in case of the design of the linear drive unit with a planetary rolling conversion drive, it is preferred to design the hollow portion of the driven rod as a steel tube provided with an internal thread. An especially favorable manner of manufacturing the internal thread is thread whirling which is known per se. Express reference is made to the fact that quite a number of features or feature combinations in claims 2 to 18 can also be realized in technically favorable manner alone, i.e. without inclusion at least of the features of claim 1. This applies especially for the types of mounting by taper ring clamping, as it is indicated in claims 6 to 8, the force-actuated deactivation, as it is indicated in claims 14 to 16, and the design of the cricumferential groove profile or thread on the internal circumference of the driven rod, as indicated in claim 18. These designs of the linear drive unit can be realized especially also in such cases when the linear drive unit comprises a different conversion drive than that according to claim 1 and/or when the linear drive unit comprises a driven rod which does not extend with a part of a hollow portion over the housing of the motor and is supported there on the housing outside. The advantages as they are achieved therewith in isolated manner have been elucidated hereinbefore in connection with the respective claims.

Figure 2:
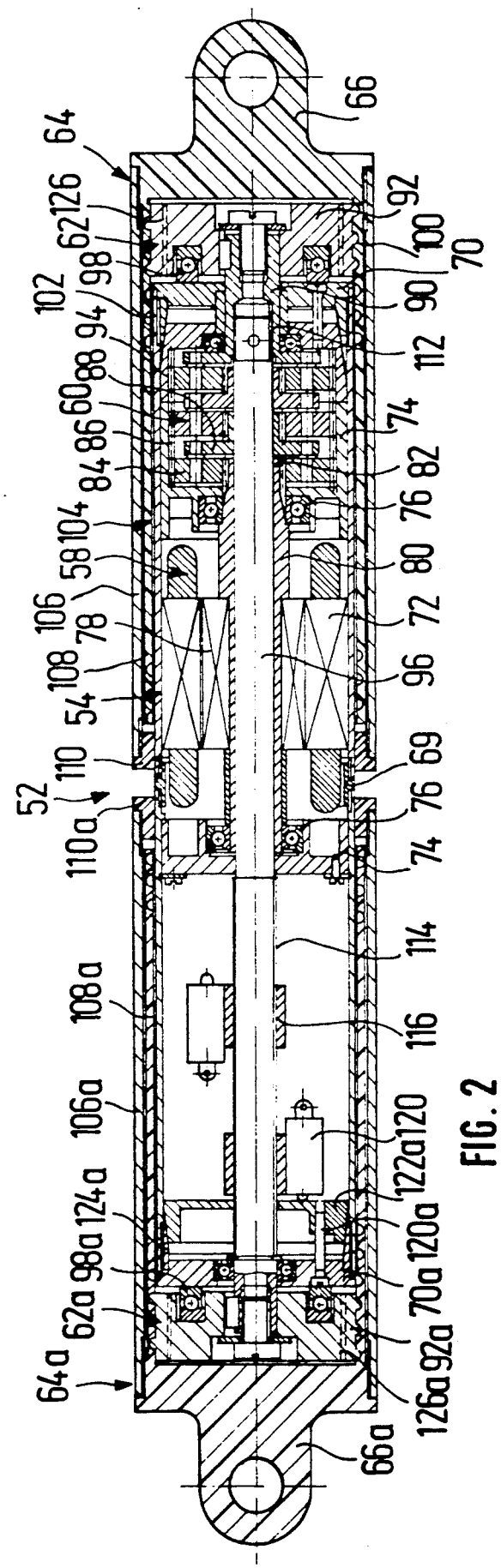
Figure 3A:
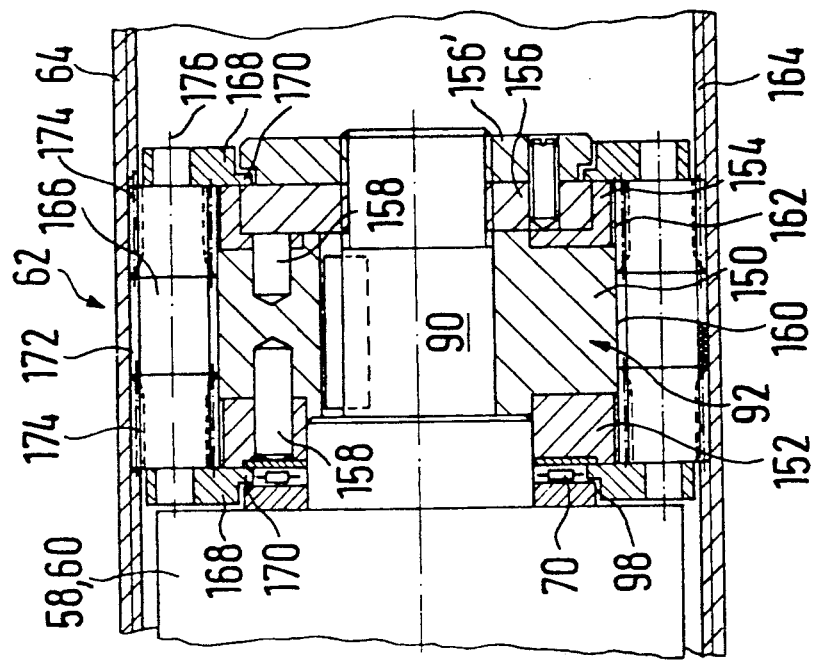
Figure 4B:
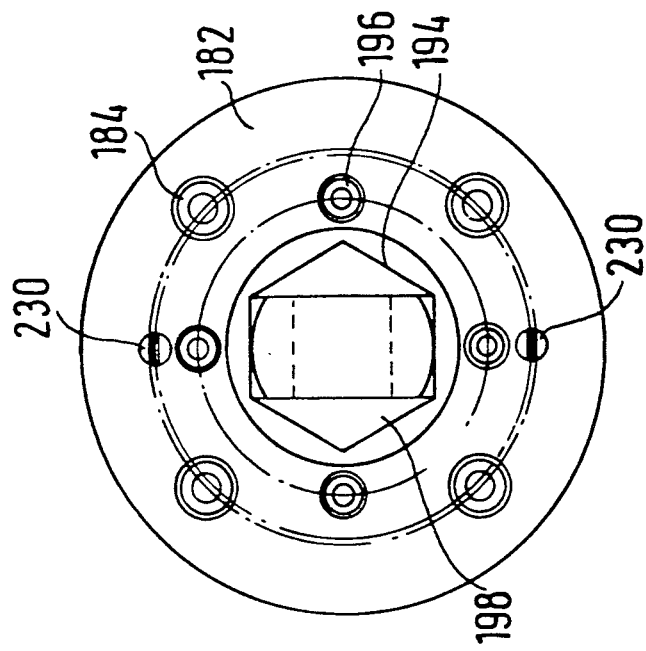
Figure 4A:
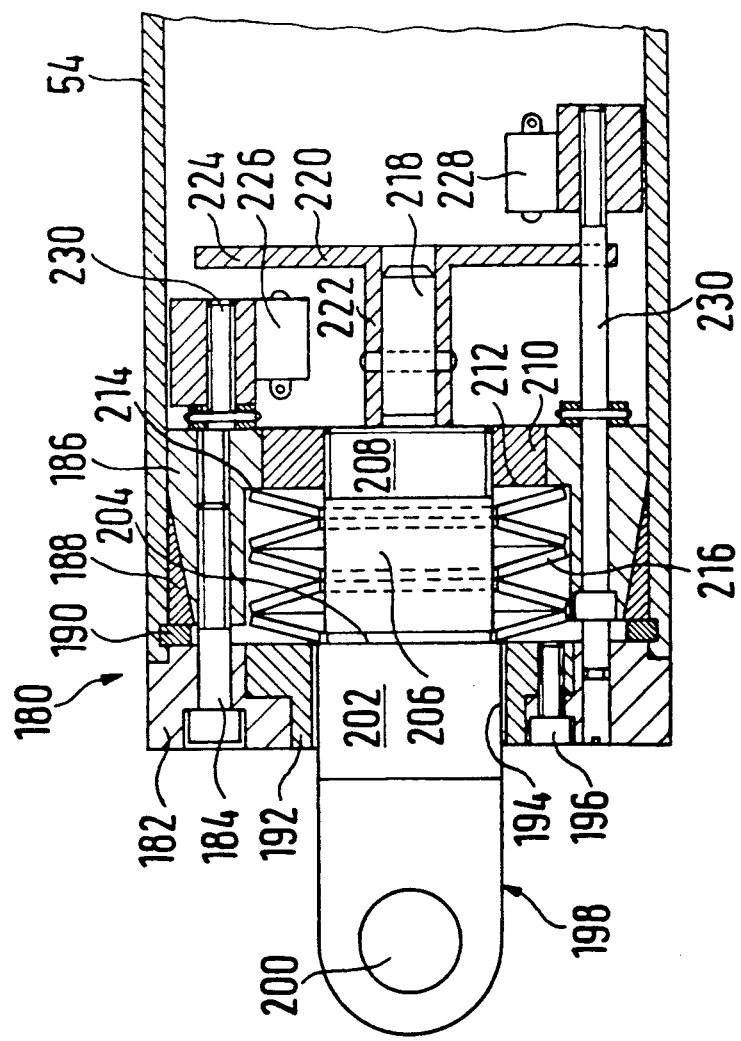

The invention and developments of the invention will now be described in more detail on the basis of several embodiments with reference to the accompanying drawings, in which FIG. 1 is a longitudinal sectional view of a linear drive unit according to a first embodiment;

FIG. 2 is a longitudinal sectional view of a linear drive unit according to a second embodiment;

FIGS. 3a an 3b are longitudinal and cross-sectional views, respectively, of a conversion drive according to the invention;

FIGS. 4a and 4b are longitudinal and cross-sectional views, respectively, illustrating end-position deactivation.

The linear drive unit shown in FIG. 1 consists essentially of a housing 54 which has a cylindrical outside configuration and has a mounting part 56 attached to the left-hand side thereof and in which an electric motor 58 as well as a three-stage planetary step-down gear means 60 are disposed, and of a conversion drive 62 on the right side beside the housing 54, as well as of a driven rod 64 having a mounting part 66 attached thereto on the right-hand side.

The housing 54 primarily consists of a tube 68 to which the mounting part 56 is mounted on the left-hand side and to which a closure or end wall 70 is mounted on the right-hand side, as it will be elucidated in more detail hereinafter. As can be seen in the drawing, slightly to the left of the center, the stator 72 of the electric motor 58, which comprises coils, is mounted in said tube 68. To the left and to the right of the stator 72, round supporting members 74 are mounted in the inside of the tube 68 which each receive in their inside a ball bearing 76 for supporting the rotor 78 of the electric motor 58. The rotor 78 has a hollow shaft 80 whose right-hand end portion is provided with teeth so as to form a pinion 82.

The pinion 82 meshes with planet wheels 84 which, in turn, mesh on their outside with the internal teeth 86 of a stationary hollow means. The planet wheels 84 are rotatably mounted on a planet carrier 88 which is also rotatable. The right-hand end portion of this planet carrier 88 is provided with teeth so as to form a pinion. This portion is followed by two additional planetary gear means stages which are composed analogously to the afore-described first planet stage; however, the third planet carrier is lengthened to the right so as to extend out of the housing 54 and to thus form a driving shaft 90 for a drive body or drive disk 92. The planet wheels 84 of all three planet stages mesh on their outside with the internal teeth 86 which are formed partly in an axial extension of the right-hand supporting member 74 projecting to the right, and partly in an axially adjacent additional supporting member 94. The first and the second planet carrier are rotatably mounted on an intermediate shaft 96 which will be described in more detail hereinafter. The third planet carrier or driving shaft 90 is radially supported by a slide bearing in the supporting member 94 and the end wall 70, with an axial rolling bearing being interposed towards the supporting member 94.

On the right end of the driving shaft 90, the drive disk 92 is disposed in unrotatable and axially held manner. The drive disk 92 is located axially adjacent to the right-hand side of the end wall 70 and is supported against the end wall 70 by means of an axial ball bearing 98. The outer diameter of the drive disk 92 is somewhat larger than the outer diameter of the tube 68, and the drive disk 92 is provided on its outside with a thread 100 having a semicircular-convex thread profile. The external thread 100 of the drive disk 92 meshes with a matching internal thread 102 on the internal circumference of a hollow portion 104 of the driven rod 64. The internal thread 102 extends almost over the entire length of the hollow portion 104, and the hollow portion 104, starting from the left-hand end, extends almost through the entire length of the driven rod 64. Only the mounting part 66 is provided adjacent thereto on the right-hand side. The internal thread 102 is made in that plastics material 108 has been injection molded in substantially hollow cylindrical manner, so as to correspond to the configuration of the internal thread 102, into a steel tube 106 provided with a fine-pitch thread on its inside. The fine-pitch thread mentioned holds the plastics part 108, especially in axial direction. For obtaining additional safety, it would be possible to provide headless screws or pins in addition. On the left-hand end of the hollow portion 104, a plastics ring 110 is screwed-in and secured which is adapted to slide with its internal circumference on the external circumference of the housing tube 68 in axial direction. The ring 110 may have a separate seal on its inside, if necessary.

In the completely retracted condition of the linear drive unit 52 shown in the drawing, the ring 110 is located approximately at the left-hand end of the housing 54. The driven rod 64 can be moved out relative to the housing 54 until the ring 110 has travelled to a location close to the drive disk 92. Thus, the stroke of the linear drive unit 52 is only slightly less than the length of the steel tube 106.

The intermediate shaft 96, which was already mentioned briefly hereinbefore, is received at its right-hand end portion in a corresponding, leftwardly open, central blind bore 112 of the driving shaft 90 and is fixed in unrotatable manner. The intermediate shaft 96 extends leftwardly through the step-down gear means 60 and the hollow shaft 80 of the electric motor 58. The left-hand end portion of the intermediate shaft 96 is provided with a thread 114 on which a travelling nut 116 travels in axial direction upon rotation of the intermediate shaft 96. The travelling nut 116 is supported in unrotatable but axially slidable manner in the left-hand supporting member 74. The travelling nut 116 is formed on its outside with two switching cams 118 each cooperating with a limit switch 120 mounted on the left-hand supporting member 74. In this manner the electric motor 58 is deactivated both when the linear drive unit 52 reaches the completely retracted state and when it reaches the completely expanded state.

The left-hand mounting part 56 in the form of a mounting eye is secured to the left end of the housing 54 in that screws 120 are threaded from the outside in axial direction into an inner ring 122 with conical outside, and in that a slotted intermediate ring 124 with complementary conical inside is interposed between the inner ring 122 and the mounting part 56, with said intermediate ring 124 being pressed radially outwardly against the end portion of the tube 68 by tightening of the screws 120. Forces acting in the direction of withdrawal of the mounting part 56 consequently result in an increase of the clamping force of the intermediate ring 124 in the housing tube 68. On the right-hand end of the housing 54, the end wall 70 is mounted in completely analogous manner on the housing tube 68, with the additional supporting member 94 serving as inner ring for the screws.

The right-hand mounting part 66 could be secured in analogous manner to the right side of the steel tube 106 of the driven rod 64. However, the drawing shows an alternative in which the mounting part 66 is injection-molded to the right-hand end portion of the steel tube 106, integrally with the threaded plastics part 108. Thus, the right-hand mounting part 66 consists of plastics material which may have a metallic tie rod strap molded thereinto.

Furthermore, one can see passageways 126 axially extending through the drive disk 92. Between the internal circumference of the threaded plastics part 108 and the external circumference of the housing tube 68, there is a space containing grease. When the driven rod 64 is moved outwardly to the right from the position shown in the drawing, this space decreases since the axial length decreases, and grease contained therein can pass through the passageways 126 to the simultaneously increasing space on the right-hand side of the drive disk 92 and within the hollow portion 104 of the driven rod 64. During retraction of the linear drive unit 52, this grease displacement takes place in the opposite direction. The drive disk 92 has an axial width that is adapted to the possible linear force of the linear drive unit 52.

When the electric motor 58 is turned on, the rotor shaft 80 thereof drives into the three-stage planetary step-down gear means 60. From this location, the rotational force flow takes place via the driving shaft 90 to the rotating drive disk 92 which rotates at a substantially lower speed than the electric motor 58. At the place of engagement between the threads 100 and 102, the rotating movement of the drive disk 92 is converted to the linear movement of the driven rod 64. The hollow portion 104 of the driven rod 64 has a large diameter and engages with a part of its length—that is dependent on the extent of expansion of the linear drive unit 52—over the housing 54 and is supported at its open end on the outer circumference of the housing 54.

When a linear drive unit 52 with greater stroke is desired, the housing tube 68 can be lengthened by axially attaching a housing extension tube, for instance by means of a threaded intermediate ring; in this case the mounting part 56, of course, will have to be attached to the free end of the housing extension tube. The hollow portion 104 of the driven rod 64 may then be longer correspondingly. The linear drive unit 52 shown in FIG. 2 consists essentially of a housing 54 which has a cylindrical outside configuration and in which an electric motor 58 and a three-stage planetary step-down gear means 60 are disposed, of a first conversion drive 62 on the right side beside the housing 54, a second conversion drive 62a on the left side beside the housing 54, a first driven rod 64 having a mounting part 66 attached thereto on the right-hand side and of a second driven rod 64a having a mounting part 66a attached thereto on the left-hand side.

The housing 54 primarily consists of a tube 68 which, by means of a threaded intermediate ring 69, is axially composed of two tube parts and which has an end wall 70 and 70a, respectively, attached on the right-hand side and on the left-hand side thereof, as it will be elucidated in more detail hereinafter. As can be seen in the drawing, slightly to the right of the center, the stator 72 of the electric motor 58, which comprises coils, is mounted in said tube 68. To the left and to the right of the stator 72, round supporting members 74 are mounted in the inside of the tube 68 which each receive in their inside a ball bearing 76 for supporting the rotor 78 of the electric motor 58. The rotor 78 has a hollow shaft 80 whose right-hand end portion if provided with teeth so as to form a pinion 82.

The pinion 82 meshes with planet wheels 84 which, in turn, mesh on their outside with the internal teeth 86 of a stationary hollow means. The planet wheels 84 are rotatably mounted on a planet carrier 88 which is also rotatable. The right-hand end portion of this planet carrier 88 is provided with teeth so as to form a pinion. This portion is followed by two additional planetary gear means stages which are composed analogously to the aforedescribed first planet stage; however, the third planet carrier is lengthened to the right so as to extend out of the housing 54 and to thus form a driving shaft 90 for a drive disk 92. The planet wheels 84 of all three planet stages mesh on their outside with the internal teeth 86 which are formed partly in an axial extension of the right-hand supporting member 74 projecting to the right, and partly in an axially adjacent additional supporting member 94. The first and the second planet carrier are rotatably mounted on an intermediate shaft 96 which will be described in more detail hereinafter. The third planet carrier or driving shaft 90, is radially supported by a slide bearing in the supporting member 94 and the right-hand end wall 70, with an axial rolling bearing being interposed towards the supporting member 94.

On the right end of the driving shaft 90, the right-hand drive disk 92 is diposed in unrotatable and axially held manner. The drive disk 92 is located axially adjacent to the right-hand side of the right-hand end wall 70 and is supported against the end wall 70 by means of an axial ball bearing 98. The outer diameter of the drive disk 92 is somewhat larger than the outer diameter of the tube 68, and the drive disk 92 is provided on its outside with a thread 100 having a semicircular convex thread profile. The external thread 100 of the drive disk 92 meshes with a matching internal thread 102 on the internal circumference of a hollow portion 104 of the driven rod 64. The internal thread 102 extends almost over the entire length of the hollow portion 104, and the hollow portion 104, starting from the left-hand end, extends almost through the entire length of the driven rod 64. Only the mounting part 66 is provided adjacent thereto on the right-hand side. The internal thread 102 is made in that a plastics material 108 has been injection molded in substantially hollow cylindrical manner, so as to correspond to the configuration of the internal thread 102, into a steel tube 106 provided with a fine-pitch thread on its inside. The fine-pitch thread mentioned holds the plastics part 108, especially in axial direction. For obtaining additional safety, it would be possible to provide headless screws or pins in addition. On the left-hand end of the hollow portion 104, a first plastics ring 110 is screwed-in and secured which is adapted to slide with its internal circumference on the external circumference of the housing tube 68 in axial direction. The ring 110 may have a separate seal on its inside, if necessary.

The left-hand or second driven rod 64a and the left-hand or second conversion drive 62a are composed as mirror images in completely corresponding manner, with the exception of the drive of the second drive disk 92a, as it will be described hereinafter.

In the completely retracted condition of the linear drive unit 52 shown in the drawing, the rings 110, 110a are located almost in the center of the housing 54. The driven rods 64, 64a can be moved out relative to the housing 58 to the right and to the left, respectively, until the rings 110, 110a have travelled to a location close to the drive disks 92, 92a. Thus, the stroke of the linear drive unit is only slightly less than the sum of the lengths of the steel tubes 106, 106a.

The intermediate shaft 96, which was already briefly mentioned hereinbefore, is received at its right-hand end portion in a corresponding, leftwardly open, central blind bore 112 of the driving shaft 90 and is fixed therein in unrotatable manner. The intermediate shaft 96 extends leftwardly through the step-down gear means 60 and the hollow shaft 80 of the electric motor 58. A portion of the intermediate shaft 96 to the left of the left-hand supporting member 74 is provided with a thread 114 on which two travelling nuts 116, which each comprise a limit switch 120, travel in axial direction upon rotation of the intermediate shaft 96. The limit switches 120 are secured against rotation but are supported in the housing 54 in axially slidable manner and abut in their end positions against the left-hand supporting member 74 and a left-hand inner ring 122a on the left-hand end portion of the housing 54, respectively; the inner ring 122a will be described in more detail hereinafter. In this manner the electric motor 58 is deactivated both when the linear drive unit 58 reaches the completely retracted state and when it reaches the completely expanded state.

The left-hand end wall 70a is secured to the left end of the housing 54 in that screws 120a are threaded from the outside in axial direction into the left-hand inner ring 122a having a conical outside, and in that a slotted left-hand intermediate ring 124a with complementary conical inside is interposed between the inner ring 122a and the end wall 70a, with said intermediate ring 124a being pressed radially outwardly against the left-hand end portion of the tube 68 by tightening of the screws 120a. On the right-hand end of the housing 54, the right-hand end wall 70 is mounted in completely analogous manner on the housing tube 68.

The intermediate shaft 96 extends through the left-hand inner ring 122a and the left-hand end wall 70a in which it is supported with a rolling bearing. The second drive disk 92a is mounted on the left-hand end portion of the intermediate shaft 96, in a manner analogous to the first drive disk 92 on the driving shaft 90. The mounting parts 66, 66a, which are each provided in the form of a mounting eye, are injection molded to the right-hand end portion of the steel tube 106 on the right-hand side and to the left-hand end portion of the steel tube 106a on the left-hand side, respectively, with said mounting parts 66, 66a being each molded integrally with the threaded plastics part 108, 108a. Thus, the mounting parts 66, 66a consist of plastics material which may each have a metallic tie rod strap molded thereinto.

Furthermore, one can see passageways 126 axially extending through the drive disk 92. Between the internal circumference of the threaded plastics part 108 and the external circumference of the housing tube 68, there is a space containing grease. When the drive rod 64 is moved outwardly to the right from the position shown in the drawing, this space decreases since the axial length decreases, and grease contained therein can pass through the passageways 126 to the simultaneously increasing space on the right-hand side of the drive disk 92 and within the hollow portion 104 of the driven rod 64. During retraction of the linear drive unit 52, this grease displacement takes place in the opposite direction. The drive disk 92 has an axial width that is adapted to the possible linear force of the linear drive unit 52. As regards the second drive disk 92a, which has passageways 126a, the same applies in analogous manner.

When the electric motor 58 is turned on, the rotor shaft 80 thereof drives into the three-stage planetary step-down gear means 60. From this location, the rotational force flow takes place via the driving shaft 90 to the rotating drive disk 92 which rotates at a substantially lower speed than the electric motor 58. From the driving shaft 90, half of the rotating force flow passes via the intermediate shaft 96 to the second drive disk 92a. At the place of engagement between the threads 100 and 102 the rotating movement of the particular drive disk 92, 92a is converted to the linear movement of the respective driven rod 64, 64a. The hollow portion 104 of the particular driven rod 64 and 64a, respectively, has a large diameter and engages with a part of its length—which is dependent on the extent of expansion of the linear drive unit 52—over the housing 54 and is supported at its open end on the outer circumference of the housing 54.

The linear drive unit 52 is secured to a basis by means of a central mounting part, not shown, which is attached to the housing 54.

Figure 3B:
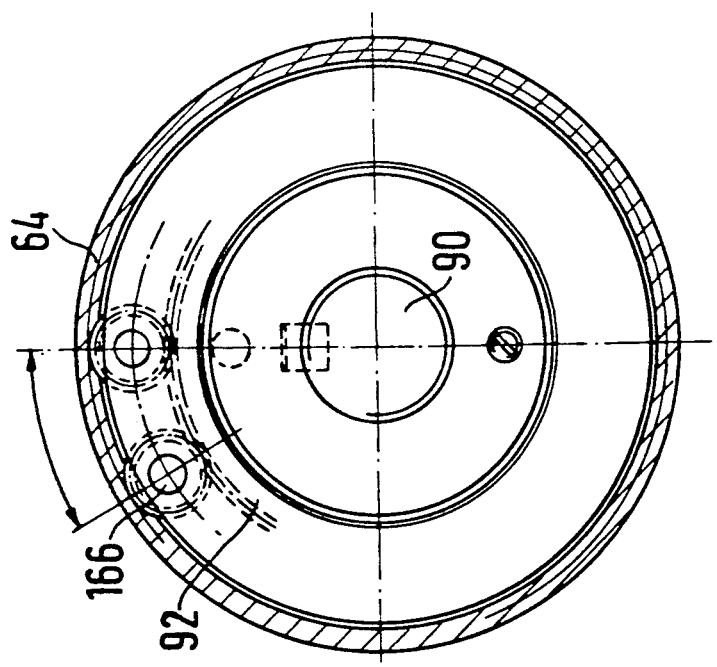

FIGS. 1 and 2 illustrate a particularly uncomplicated conversion drive 62. FIG. 3 shows a preferred, more complicated conversion drive which can be imagined to be located at the place of the conversion drive shown in FIGS. 1 and 2. The electric motor 58 and the step-down gear means 60 are illustrated only schematically. The driving shaft 90, which extends out of the step-down gear means 60, carries a drive body 92 in unrotatable manner which in essence consists of a central part 150, a ring 152 put in front thereof axially on the left-hand side, and of a ring 154 put in front thereof axially on the right-hand side. The central part 150 and the right-hand ring 154 are urged leftwardly against a shoulder of the driving shaft 90 by means of a nut 156 screwed onto the end of the driving shaft 90. The left-hand ring 152 is supported on the left-hand side against the axial bearing 98 which, in turn, is supported on the left-hand side against the end wall 70. The parts 150, 152, 154 are secured against mutual rotation by means of axial pins 158. The outer circumference of the central part 150 is provided with a groove profile 160 in the form of a six-start left-hand thread. The two rings 152, 154 are provided on their outer circumference with teeth 162 in the manner of a spur gear, with the pitch circle of the thread 160 and the pitch circles of the teeth 162 being identical with each other.

Between an inner profile 164 in the form of a six-start right-hand thread of the hollow portion of the driven rod 64 and the drive body 150, there are distributed in total twelve revolving members 166 along a circular circumference, each having their axial ends supported in two rings 168. The rings 168 each have a circular inner projection 170 which, for axially fixing the rings 168 in position, extends between the bearing rings of the axial bearing 98 and, respectively, in a circular outer groove between the nut 156 and an additional nut 156' screwed in front thereof, with both nuts having a round outside configuration. The revolving members 166 are each provided on their outer circumference, across the entire axial length thereof, with a groove profile 172 in the form of a one-start or single right-hand thread. At each of their two axial end portions, the revolving members 166 are provided with teeth 174 in the manner of a spur gear with these teeth being machined simply in addition to the thread. The pitch circles of the thread 172 and of the teeth 174 are identical with each other. The teeth 174 mesh with the teeth 162 of the rings 152, 154. Radially outside, the thread 172 is in engagement with the thread 164 of the driven rod 64. Radially inside, the central portion of the thread 172 is in engagement with the thread 160 of the central part 150. The revolving members 166 have a pitch diameter which is one sixth of the pitch diameter of the drive body 92. Thus, upon rotation of the drive body 92, the revolving members 166 rotate about their particular axes at a speed which is six times the speed of the drive body 92. Due to the fact that the engagement between the revolving members 166 and the drive body 92 is an engagement between a single right-hand thread and a six-start left-hand thread, the revolving members 166 axially remain in their positions during rotation of the drive body 92 and rotation of the revolving members 166 about their own axes as well as travelling or revolving of the axes 176 of the revolving members 166 about the drive body 92 so-to-speak like planets. As a result of the rotation of the revolving members 166, an axial linear driving force is exerted on the driven rod 64. All interengagements between the drive body 92, the revolving members 166 and the thread 164 of the driven rod 64 are of rolling instead of sliding nature and take place substantially in punctiform manner and, respectively, in the form of lines in case of the teeth. The axial width of the drive body 92 and of the revolving members 166 may be adapted to the loads arising.

FIG. 4 illustrates a force-dependent deactivation means 180 of a linear drive unit, which can be imagined as being installed at the axially left end of the linear drive unit shown in FIG. 1, either in addition to, or instead of, the position-dependent final deactivation provided therein.

Four circumferentially distributed axial screws 184 extend from a circular closure or end wall 182 of the housing 54 into an inner ring 186 having a conical outside configuration A slotted intermediate ring 188 with complementary conical inside configuration is held on its left-hand face side to the left in the housing 54 by means of a Seeger circlip ring 190. By tightening of the screws 184 the intermediate ring 188 is pressed outwardly and is clamped with high bias between the inner ring 186 and the housing 54. The end wall 182 has a bushing 192 of bronze inserted thereinto in an inner region, with said bushing 192 having a hexagonal through-opening 194 in its center. The bushing 192 is mounted to the end wall 182 by means of axial screws 196.

A mounting part 198, which is formed with a connection eye 200 in the axially left-hand end portion, has a portion 202 which is located to the right of the connection eye 200 and which is of hexagonal cross-section and is passed in fitting manner through the hexagonal opening 194 of the bushing 192. Following said portion 202 on the right-hand side, there is provided, adjacent a shoulder 204, a cylindrical portion 206 of the mounting part 198, which is of somewhat smaller outside diameter. This portion is followed on the right-hand side by a threaded portion 208 having a nut 210 with round outside screwed thereonto. The round outside circumference of the nut 210 is slidably received in a corresponding inner bore of the intermediate ring 286. The intermediate ring 286 has a leftwardly facing shoulder 214 on its internal circumference.

A spring unit 216 in the form of a biased cup spring assembly is provided which, in the illustrated rest condition of the linear unit, is supported on the right side at a radially outer location on the shoulder 214 of the intermediate ring 186, on the right side at a radially further inside location on the left-hand face area 212 of the nut 210, on the left side at a radially inside location on the shoulder 204 of the mounting part 198, and on the left side at a radially further outside location on the bushing 192. Thus, the elements 204 and 212 form shoulders of the mounting part 198 and the elements 214 and 192 form abutments associated with the housing 54. On a cylindrical extension 218 of the mounting part 198, which projects axially to the right, there is mounted an actuation member 220 which has a leftwardly projecting hollow-cylindrical extension 222 for mounting on the extension 218 and which, rightwardly thereof, substantially has the configuration of an upright rectangular plate whose plane extends at right angles to the longitudinal axis of the mounting part 198 and of the linear drive unit. Somewhat to the left of the plate 224, there is provided a first microswitch 226, and somewhat to the right of the plate 224, there is provided a second microswitch 228. The axial positions of the microswitches 226, 228 may be adjusted by adjustment spindles 230 extending axially through the intermediate ring 186 and the end wall 182 to the outside.

When the linear drive unit delivers tensile forces, thus tending to withdraw the mounting part 198 leftwardly from the housing 54, the spring unit 216 is compressed between the nut 210 and the bushing 192, whereby the hexagonal portion 202 of the mounting part 198 travels axially in the opening 194 and the outer circumference of the nut 210 travels axially in the corresponding bore of the intermediate ring 186. When this compression has reached a predetermined value, the plate 224 of the actuation member 220 strikes the first microswitch 226 and deactivates the driving motor of the linear drive unit.

When, in contrast thereto, the linear drive unit delivers pressure forces, thus tending to displace the mounting part 198 rightwardly as seen in FIG. 4, the spring unit 216 is increasingly compressed between the shoulder 204 of the mounting part 198 and the shoulder 214 of the intermediate ring 186, with the hexagonal portion 202 and the nut 210 travelling again in axial direction as described hereinbefore, but in this case to the right. When this displacement has reached a predetermined value, the right-hand surface of the plate 224 moves against the second microswitch 228, whereby the driving motor of the linear drive unit is deactivated.

The rotation of the nuts 156 (FIG. 3) and 210 can be effected, for instance, with the aid of a tool engaging in face-end axial bores (not shown) of the particular nut.

It is pointed out that, when the linear drive unit 52 delivers high linear forces, the connections between the supporting ring 94 and the housing 54 as well as between the left-hand mounting part 56 and the housing 54 must transmit high loads, not only in tensile direction and in pressing direction but also in the form of reaction torques, since the housing 54 carries the internal teeth of the planetary step-down gear means 60. Especially at these locations, the described modes of taper ring clamping constitute a particularly suitable type of connection. The same applies in similar manner to the mounting of the end wall 182 on the housing 54 (cp. FIG. 4), since the mounting part 198 is held in non-rotatable manner in the housing 54 via the hexagonal opening 194 and the hexagonal portion 202 or, respectively, since the mounting part 198, which is mounted with its mounting eye 200 on an outer part, fixes the entire housing 54 against rotation about the longitudinal axis thereof via the hexagonal portion 202 and the hexagonal opening 194 and the taper ring clamping described.

I claim:
1. A linear drive unit (52), comprising:
   (a) a housing (54) in which a driving motor (58) is accommodated;
   (b) a driven rod (64) adapted to be driven in linear manner and having a hollow portion (104) which partly extends over the housing (58) and is supported on the outer circumference of the housing (54) in axially slidable manner;
   (c) a conversion drive (62) which is in driving connection with the motor (58) and the driven rod (64) and converts rotational movement into linear movement of the driven rod (64);
   (d) a drive body (92) which belongs to the conversion drive (62) and is adapted to be driven by the motor in rotating manner and which is provided on its outer circumference with a circumferential groove profile (160) and with teeth (162);

(e) a plurality of axially extending revolving members (166) which are rotatable about their own axes and which each have a circumferential groove profile (172) as well as teeth (174);

(f) engagement of the groove profiles (172) of the revolving members (166) at a radially inner location with the groove profile (160) of the drive body (92) and at a radially outer location with a circumferential groove profile (164) on the inner circumference of the hollow portion (104) of the driven rod (64), as well as engagement of the teeth (174) of the revolving members (166) with the teeth (162) of the drive body (92);

(g) a design of the groove profiles (150, 172, 164) of the drive body (92), the revolving members (166) and the hollow portion (104) of the driven rod in such a manner that, during rotation of these parts, there is no axial relative movement between the drive body (92) and the revolving members (166) and the driven rod (64) carries out an axial relative movement with respect to the revolving members (166).

2. A linear drive unit according to claim 1, characterized in that the groove profiles (150, 172) of the drive body (92) and of the revolving members (166) are designed as threads, with the thread direction of the revolving members (166) being opposite to the thread direction of the drive body (92).

3. A linear drive unit according to claim 2, characterized in that the thread pitch diameter and the teeth pitch diameter of the drive body (92) are n-times the particular thread pitch diameter and the particular teeth pitch diameter of the revolving members (166); and in that the particular thread of the revolving members (166) is a single-start thread and the thread of the drive body (92) is, an n-start thread; with n being an integer 1, 2, 3, . . .

4. A linear drive unit according claim 1, characterized in that the revolving members (166) are supported in two rings (168) which are rotatable relative to the drive body (92).

5. A linear drive unit according to claim 1, characterized in that the space between the housing (54) and the hollow portion (104) of the driven rod (64) contains lubricant, and in that axial lubricant passageways (126) are provided in the drive body (92).

6. A linear drive unit according to claim 1, characterized in that on a first axial end there is provided a mounting part (56) on the housing (54), which is mounted preferably by taper ring clamping (120, 122, 124).

7. A linear drive unit according to claim 1, characterized in that on the axial end facing away from the housing (54), there is provided a mounting part (66) on the driven rod (64), which is attached preferably by screw-type engagement, injection molding or taper ring clamping.

8. A linear drive unit according to claim 1, characterized in that on a second axial end there is provided an end wall (70) on the housing (54), preferably by taper ring clamping, and in that an axial bearing (98) is preferably provided between the end wall (70) and the drive body (92) of the conversion drive (62).

9. A linear drive unit according to claim 1, characterized in that a step-down gear means is provided between the motor and the drive body, preferably a one-stage or a multi-stage planetary step-down gear means (60).

10. A linear drive unit according to claim 9, characterized in that the step-down gear means (60) is accommodated in the housing (54).

11. A linear drive unit according to claim 1, characterized in that the housing (54) is longer on the side facing away from the drive body (92) than it is necessary for accommodation of the motor (58) and, optionally, of the gear means (60), preferably by attachment of a housing extension part.

12. A linear drive unit according to claim 1, characterized by at least one limit switch (120) adapted to be actuated by an actuation member (116) movable in linearly driven manner.

13. A linear drive unit according to claim 12, characterized in that a shaft (90) driving the drive body (92) has a transmission shaft coupled therewith which extends through the hollow rotor (78) of the motor (58) and, optionally, through the step-down gear means (60) and which, on the other axial side of the motor (58), is in engagement, in the form of a threaded spindle (96), with a travelling nut (116) so as to form a limit switch actuation member.

14. A linear drive unit according to claim 1, characterized by at least one switch which is actuated when a predetermined axial force supplied by the linear drive unit is exceeded, said actuation being effected preferably by axial deflection movement of two parts of the linear drive unit (52) relative to each other, which movement is possible against spring force.

15. A linear drive unit according to claim 14, characterized in that, on an axial end of the linear drive unit (52), there is provided a mounting part (198) which is held unrotatably relative to the housing (54) and which extends in axially slidable manner through an end wall opening (194) into the interior of the linear drive unit (52); that a spring unit (216) is provided between a shoulder (212) formed on the mounting part (198) and an abutment (192) in the linear drive unit (52); and in that the mounting part (198) is provided with an actuation member (220) which actuates the at least one switch upon sufficiently great displacement of the mounting part (198) in the end wall opening (194).

16. A linear drive unit according to claim 15, characterized in that, for both axial directions of deflection movement of the mounting part (198), there is provided a spring unit (216) which is supported on the side opposite the shoulder (212), at a radially inner location against an additional shoulder (204) of the mounting part (198) and at a radially further outer location against the abutment (192), and at a location radially outside of the first shoulder (212) against an additional abutment (214).

17. A linear drive unit according to claim 1, characterized in that the shaft (90) driving the drive body (92) has an intermediate shaft (96) coupled therewith which extends through the hollow rotor (78) of the motor (58) and, optionally, through the step-down gear means (60) and which carries, on the other axial side of the motor (58), an additional drive body (92a) forming together with an additional driven rod (64a) an additional conversion drive (62a).

18. A linear drive unit according to claim 1, characterized in that the circumferential groove profile (164) on the internal circumference of the driven rod (64) is provided on at least two sleeves which are axially placed against each other and welded in a common tube slid thereonto.

19. A linear drive unit, comprising:

(a) a housing in which a driving motor is accommodated;
(b) a driven rod adapted to be driven in linear manner;
(c) a conversion drive which is in driving connection with the motor and the driven rod and converts rotational movement into linear movement of the driven rod;
(d) a mounting part provided on an axial end of the linear drive unit and held unrotatable relative to the housing, the mounting part extending in axially slidable manner through an end wall opening into an interior portion of the linear drive unit;
(e) a spring unit provided between a shoulder formed on the mounting part and an abutment in the linear drive unit; and
(f) an actuation member associated with the mounting part for actuating at least one switch when a predetermined axial force supplied by the linear drive unit is exceeded and a sufficiently great displacement o the mounting part in the end wall opening takes place against the spring force of the spring unit.

* * * * *